Nov. 25, 1947.   C. M. WICKSTRUM   2,431,596

CREAM SEPARATOR

Filed Aug. 27, 1945

INVENTOR.
C. M. Wickstrum
BY
ATTORNEYS.

Patented Nov. 25, 1947

2,431,596

UNITED STATES PATENT OFFICE 2,431,596

CREAM SEPARATOR

Cecil M. Wickstrum, Omaha, Nebr.

Application August 27, 1945, Serial No. 612,877

6 Claims. (Cl. 137—20)

In cream separators of known construction, wherein air pressure is set up in a container to force the cream from the container through a discharge tube, there is always present a layer of cream of considerable thickness which remains around the edge of the container, decreasing in thickness at the center of the container, and from which point the cream is removed, indicating that a considerable amount of milk has been removed during the separating operation, the cream around the edges or at the inner surface of the container, having taken the place of the milk. This condition is caused by the inertia of the cream and the failure of the cream to move to the intake end of the discharge tube located at the center of the container.

It is therefore the object of the present invention to provide means whereby the air, which is supplied to create pressure within the container, will be directed to the inner surface of the container, to the end that the cream in the container will be directed inwardly towards the discharge tube from the edge or inner surface of the container, eliminating the possibility of removing milk with the cream, during the separating operation, thereby insuring the recovery of an exceptionally high-grade cream.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
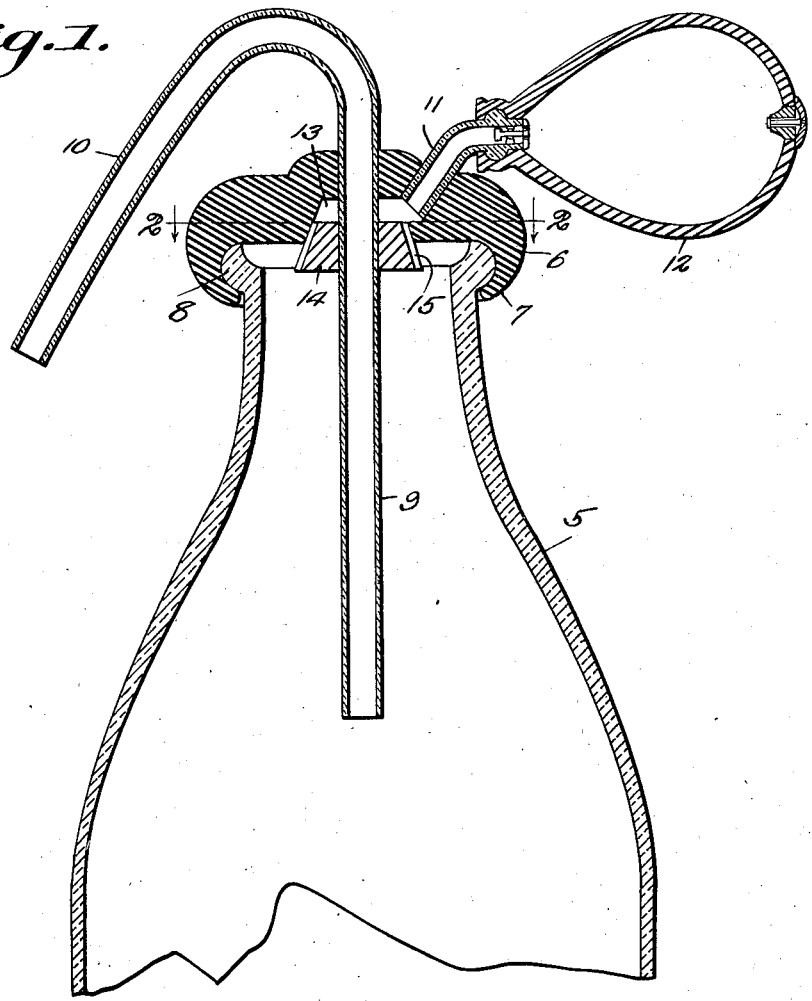
Figure 1 is a longitudinal sectional view of a container which in the present showing is in the form of a milk bottle, equipped with a cream separator, constructed in accordance with the invention.

Referring to the drawing in detail, the reference character 5 indicates the receptacle or container with which the cream separator is used, the container in the present showing however, being in the form of a milk bottle in which milk is sold.

The reference character 6 indicates the body portion of the cream separator, which is in the form of a cap, the cap having an inturned annular flange 7 adapted to be fitted over the external bead 8 of the milk bottle in such a way as to provide an air-tight connection between the bottle and body portion or cap.

Extending downwardly through the central portion of the cap 6, is the discharge tube 9 which is held in position with the cap by frictional contact with the wall of the opening through which it extends, the connection between the tube and cap being such that it will be air-tight, but at the same time permit of vertical adjustment of the tube through the opening of the cap, so that the inner end or end of the tube disposed within the container, may be moved to the desired position within the cream to separate the desired quantity of cream.

As clearly shown, the discharge tube is formed with a downwardly and outwardly extended discharge end 10 which may be positioned to discharge the cream as it passes through the discharge tube, into a receiving vessel.

An opening is formed in the cap or body portion 6 for the reception of the tube 11 to the outer end of which is connected the pressure bulb 12 which is supplied with suitable valves whereby flexing of the bulb will result in air being drawn into the bulb and forced outwardly through the tube 11.

The cap is formed with a recess 13 disposed within the inner surface thereof, the wall of the recess being inclined, to accommodate the frusto-conical shaped plug 14, which plug is constructed of material such as rubber so that it may be moved within the recess to various positions. The upper end of the plug 14 provides a chamber with the inner upper end of the recess 13, the tube 11 communicating with the chamber so that air forced through the tube 11, will be more or less compressed in the chamber.

Figure 2:
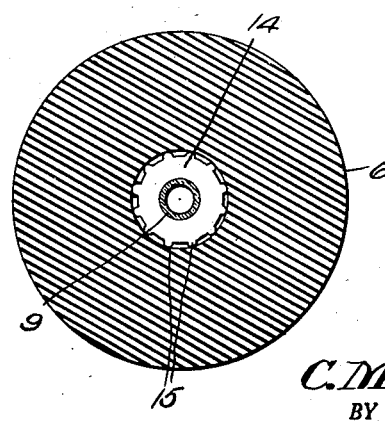
Figure 2 is a sectional view taken on line 2—2 of Fig. 1.

As clearly shown by Fig. 2 of the drawing, the periphery of the plug 14 is fluted providing a plurality of inclined channels 15 which are so disposed, that they direct air from the chamber outwardly, against the wall of the container to remove cream which adheres to the wall of the container and which is that portion of the cream having the heavier body.

Then too, due to this construction, the cream is forced to take a sweeping motion to direct it to the intake end of the discharge tube 9, eliminating the possibility of the air being forced directly downwardly within the container to act on the cream that is adjacent to the intake end of the discharge tube.

From the foregoing it will be seen that due to the construction shown and described, the cream being lighter than the milk, the air which is forced into the container by compressing the bulb, is brought downwardly over the inner surface of the side walls of the container, which tends to sweep the cream to the center, to a point adjacent to the intake end of the discharge tube.

What is claimed is:

1. A cream separator adapted to be positioned in a container containing milk and cream, comprising a cap adapted to be fitted over the mouth of the container in air-tight relation therewith, said cap having a recess formed in the inner surface thereof, a plug fitted within the recess, said plug providing an air chamber with the inner end wall of the chamber, said plug having discharge openings so constructed and arranged that air from said chamber is directed downwardly and outwardly against the inner surface of the container, forcing the cream within the container inwardly towards the center of the container, a discharge tube adapted to be extended through a central opening formed in the cap and plug, and means for creating air pressure within the chamber.

2. A cream separator adapted to be positioned in a container containing milk and cream, comprising a cap adapted to be fitted over the mouth of the container in air-tight relation therewith, said cap having a recess formed in the inner surface thereof, a plug fitted within the recess, said plug providing an air chamber with the inner end of the wall of the chamber, a discharge tube adapted to be extended through a central opening formed in the cap and plug, said plug having openings downwardly and outwardly inclined at acute angles with respect to the vertical, establishing communication between the chamber and container, said openings adapted to direct jets of air against the inner surface of the container forcing cream inwardly towards the discharge tube, and means for creating air pressure within the chamber.

3. A cream separator adapted to be positioned in a container containing milk and cream, comprising a cap adapted to be fitted over the mouth of the container in air-tight relation therewith, said cap having a recess formed with a tapered wall, a tapered plug fitted within the recess and providing an air chamber with the inner wall of the recess, said plug having its periphery fluted, providing a plurality of downwardly and outwardly inclined channels establishing communication between the container and air chamber, a discharge tube extending through the cap and plug and having air-tight connection with the cap and plug, said channels adapted to direct jets of air against the wall of the container, whereby cream in the container is forced inwardly to the discharge tube, and means for creating air pressure in said air chamber.

4. A cream separator adapted to be positioned in a container containing milk and cream, comprising a cap adapted to be fitted over the mouth of the container in air-tight relation therewith, said cap having a recess formed in the inner surface thereof, said recess having a tapered wall, a plug fitted within the recess and having a tapered periphery whereby said plug is adjustably held within the recess, the inner end of the plug being spaced from the end wall of the recess providing an air chamber, said plug having a plurality of discharge openings formed therein, the openings being downwardly and outwardly inclined at acute angles with respect to the vertical whereby air forced into the air chamber will be directed into the container against the inner surface of the container, a discharge tube extending through the cap and plug and adjustably held in position by the cap and plug, and means for creating air pressure in the air chamber.

5. A cream separator adapted to be positioned in a container containing milk and cream, comprising a cap adapted to be fitted over the mouth of the container, in air-tight relation therewith, said cap having a recess, a plug fitted within the recess and providing an air chamber with the inner end of the recess, said plug having a plurality of openings downwardly and outwardly inclined at acute angles with respect to the vertical and being arranged in a circular line, a discharge tube extending through the cap and plug, and means for creating air pressure within the air chamber whereby air will be directed into the container in a circular line of jets forcing the cream adjacent to the wall of the container, inwardly towards the discharge tube.

6. A cream separator adapted to be positioned in a container containing milk and cream, comprising a cap, a tube extending through the cap, one end of the tube being disposed within the container, a plug fitted on the tube, said plug having openings downwardly and outwardly inclined at an acute angle with respect to the vertical and through which air is directed against the inner surface of the container, whereby cream is forced inwardly from the sides of the container, into said tube, and means for directing air to the openings of the plug.

CECIL M. WICKSTRUM.

REFERENCES CITED

The following references are of record in the file of this patent:

UNITED STATES PATENTS

| Number | Name | Date |
|---|---|---|
| 692,523 | Kammerer | Feb. 4, 1902 |
| 1,788,709 | De Spain | Jan. 13, 1931 |
| 1,328,866 | Yeatter | Jan. 27, 1920 |